United States Patent
Zhang

(10) Patent No.: US 10,345,649 B2
(45) Date of Patent: Jul. 9, 2019

(54) CONCAVES FOR BACKLIGHT SOURCE, DISPLAY MODULE, AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Qi Zhang, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

(*) Notice: Subject to any disclaimer, the term of this patent is extended or adjusted under 35 U.S.C. 154(b) by 0 days.

(21) Appl. No.: 15/944,140

(22) Filed: Apr. 3, 2018

(65) Prior Publication Data

US 2019/0056624 A1 Feb. 21, 2019

(30) Foreign Application Priority Data

Aug. 21, 2017 (CN) .................. 2017 2 1049651 U

(51) Int. Cl.
G02F 1/1335 (2006.01)
F21V 8/00 (2006.01)
G02F 1/1333 (2006.01)

(52) U.S. Cl.
CPC ..... G02F 1/133615 (2013.01); G02B 6/0055 (2013.01); G02F 1/133308 (2013.01); G02B 6/0021 (2013.01); G02B 6/0065 (2013.01)

(58) Field of Classification Search
CPC .. G02B 6/0055; G02B 6/0066; G02B 6/0073; G02F 2001/133311

USPC .................................. 362/623–625
See application file for complete search history.

(56) References Cited

U.S. PATENT DOCUMENTS

| 7,507,012 B2* | 3/2009 | Aylward | G02B 6/0028 362/624 |
| 7,997,784 B2* | 8/2011 | Tsai | G02B 6/0021 362/621 |
| 2007/0008739 A1* | 1/2007 | Kim | G02B 6/0021 362/612 |
| 2008/0285307 A1* | 11/2008 | Aylward | G02B 6/0028 362/618 |
| 2012/0170317 A1* | 7/2012 | Tsai | G02B 6/0021 362/621 |
| 2014/0056027 A1* | 2/2014 | Ma | G02B 6/0011 362/611 |
| 2015/0370005 A1* | 12/2015 | Tsai | G02B 6/0083 362/612 |
| 2018/0128963 A1* | 5/2018 | Ho | G02B 6/006 |

FOREIGN PATENT DOCUMENTS

KR 20070101517 A * 10/2007
WO WO-2010085015 A1 * 7/2010 ........... G02B 6/0021

* cited by examiner

Primary Examiner — Diane I Lee
Assistant Examiner — Keith G. Delahoussaye
(74) Attorney, Agent, or Firm — Kinney & Lange, P.A.

(57) ABSTRACT

A backlight source, a display module and a display device are provided. A back plate of the backlight source includes a bottom plate and a side plate. The side plate and the bottom plate define an accommodation cavity. A plurality of concaves is provided on a first surface of the bottom plate away from the light guide plate, and the plurality of concaves are depressed toward a second surface of the bottom plate close to the light guide plate.

18 Claims, 3 Drawing Sheets

CONCAVES FOR BACKLIGHT SOURCE, DISPLAY MODULE, AND DISPLAY DEVICE

CROSS-REFERENCE TO RELATED APPLICATION

The present application claims a priority of the Chinese patent application No. 201721049651.5 filed on Aug. 21, 2017, which is incorporated herein by reference in its entirety.

TECHNICAL FIELD

The present disclosure relates to the field of display technology, in particular to a backlight source, a display module and a display device.

BACKGROUND

For a conventional liquid crystal display device, its backlight source mainly includes a back plate, a reflecting sheet and a light guide plate. In order to provide the backlight source having a weight within a predetermined range, usually the back plate is made of a lightweight aluminum alloy material, but it may easily be deformed when the back plate is engaged with a sealant. Along with the development of a flat-panel computer with a super narrow bezel, the backlight source also needs to be provided with a super narrow bezel, i.e., a wall thickness of the sealant needs to be smaller than 0.65 mm. At this time, it is difficult to shape the sealant, and the sealant may easily be deformed during the assembling. In addition, an adhesive tape for the fixation of a liquid crystal cell is too narrow to cover a gap between the sealant and the light guide plate, so it is difficult to prevent the occurrence of such a phenomenon as bright lines for the backlight source.

SUMMARY

In one aspect, the present disclosure provides in some embodiments a backlight source, including: a back plate including a bottom plate and a side plate, the side plate and an upper surface of the bottom plate defining an accommodation cavity; and a light guide plate arranged within the accommodation cavity. A plurality of concaves are provided on a surface of the bottom plate away from the light guide plate, the plurality of concaves are depressed toward another surface of the bottom plate close to the light guide plate.

In a possible embodiment of the present disclosure, a planarization layer for filling up the plurality of concaves is arranged on the surface of the bottom plate away from the light guide plate, so as to provide a planar surface.

In a possible embodiment of the present disclosure, the planarization layer is a black adhesive layer.

In a possible embodiment of the present disclosure, a reflection layer is arranged on the other surface of the bottom plate close to the light guide plate.

In a possible embodiment of the present disclosure, wherein the reflection layer is made of silver and has a thickness of 0.02 mm to 0.05 mm.

In a possible embodiment of the present disclosure, a groove is provide at a light-entering side of the light guide plate, and the backlight source further comprises a light source arranged within the groove.

In a possible embodiment of the present disclosure, the light source comprises at least two light bars, at least two grooves are provide at a light-entering side of the light guide plate, the at least two light bars are arranged in the at least two grooves respectively.

In a possible embodiment of the present disclosure, the light guide plate is injection-molded with the accommodation cavity as a die cavity, and the groove is formed using an injection molding processor for forming the light guide plate.

In a possible embodiment of the present disclosure, the light guide plate further comprises a light-exiting surface arranged opposite to the other surface of the bottom plate close to the light guide plate.

In a possible embodiment of the present disclosure, the groove extends to the light-exiting surface of the light guide plate.

In a possible embodiment of the present disclosure, the backlight source further includes an optical membrane fixedly adhered onto the light-existing surface of the light guide plate through a first adhesive layer. The display panel is fixedly adhered onto a surface of the optical membrane away from the light-existing surface through the second adhesive layer.

In a possible embodiment of the present disclosure, the light bar is of a shape adapted to a shape of the groove and has a length same as a depth of the groove.

In a possible embodiment of the present disclosure, the optical membrane comprises a diffuser, a lower prismatic lens and an upper prismatic lens sequentially arranged on the light-exiting surface of the light guide plate, and the first adhesive layer is arranged between the lower prismatic lens and the light-exiting surface of the light guide plate.

In a possible embodiment of the present disclosure, the backlight source has a thickness smaller than 0.85 mm.

In yet another aspect, the present disclosure provides in some embodiments a display module including a display panel and the above-mentioned backlight source.

In a possible embodiment of the present disclosure, the display panel is fixedly adhered through a second adhesive layer onto a side of the light guide plate where a light-exiting surface is located.

In a possible embodiment of the present disclosure, the backlight source further comprises an optical membrane fixedly adhered onto the light-existing surface of the light guide plate through a first adhesive layer, and the display panel is fixedly adhered onto a surface of the optical membrane away from the light-existing surface through the second adhesive layer.

In yet another aspect, the present disclosure provides in some embodiments a display device including the above-mentioned display module.

In still yet another aspect, the present disclosure provides in some embodiments an edge-type backlight source, including: a back plate, the back plate comprising a bottom plate and a side plate, the side plate and the bottom plate defining an accommodation cavity, the bottom plate being provided with a plurality of concaves depressed toward the accommodation cavity, a reflection layer being arranged on a surface of the bottom plate used to form the accommodation cavity, a black adhesive layer for filling up the concaves being arranged on another surface of the bottom plate opposite to the surface of the bottom plate used to form the accommodation cavity, so as to provide a planar surface; a light guide plate injection-molded with the accommodation cavity as a die cavity and arranged within the accommodation cavity in such a manner that the light guide plate is engaged with the back plate in a seamless manner, a light-exiting surface of the light guide plate being arranged opposite to the surface of the bottom plate used to form the accommodation cavity, a light-entering surface of the light guide plate being arranged close to the light-exiting surface, at least two grooves being formed at a light-entering side of the light guide plate using an injection molding process for forming the light guide plate, each groove extending to the light-exiting surface of the light guide plate; a light source comprising at least two light bars arranged within the grooves respectively, each light bar being of a shape adapted to a shape of the groove and a length same as a depth of the groove; and an optical membrane comprising a diffuser, a lower prismatic lens and an upper prismatic lens sequentially arranged on the light-exiting surface of the light guide plate, a transparent adhesive being applied onto a surface of the upper prismatic lens adjacent to the light guide plate so as to form a first adhesive layer, the optical membrane being fixedly adhered onto the light-exiting surface of the light guide plate through the first adhesive layer, and the upper prismatic lens being configured to fixedly press the light bar into the corresponding groove through the first adhesive layer.

In a possible embodiment of the present disclosure, a nontransparent adhesive is applied onto a surface of the upper prismatic lens away from the light guide plate so as to form a second adhesive layer for fixedly adhering the optical membrane onto a liquid crystal display panel. The second adhesive layer is arranged at a position corresponding a non-display region of the liquid crystal display panel.

BRIEF DESCRIPTION OF THE DRAWINGS

In order to illustrate the technical solutions of the present disclosure or the related art in a clearer manner, the drawings for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Figure 1:
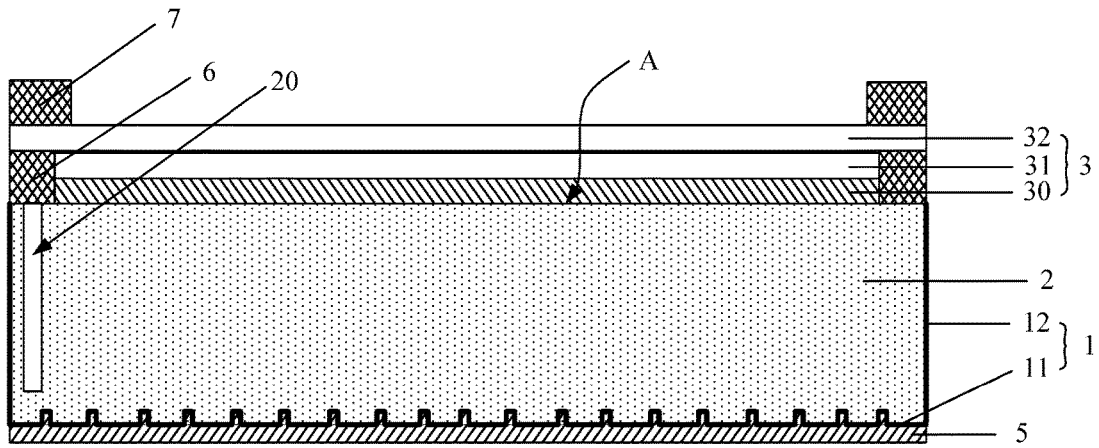
FIG. 1 is a sectional view of an edge-type backlight source according to one embodiment of the present disclosure.
Figure 3:
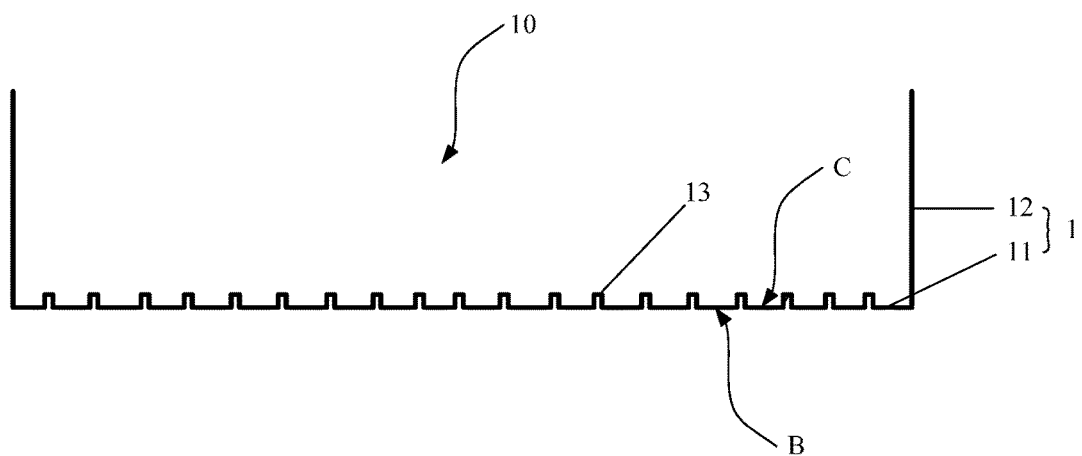
FIG. 3 is a topical schematic view showing a back plate according to one embodiment of the present disclosure.
Figure 4:
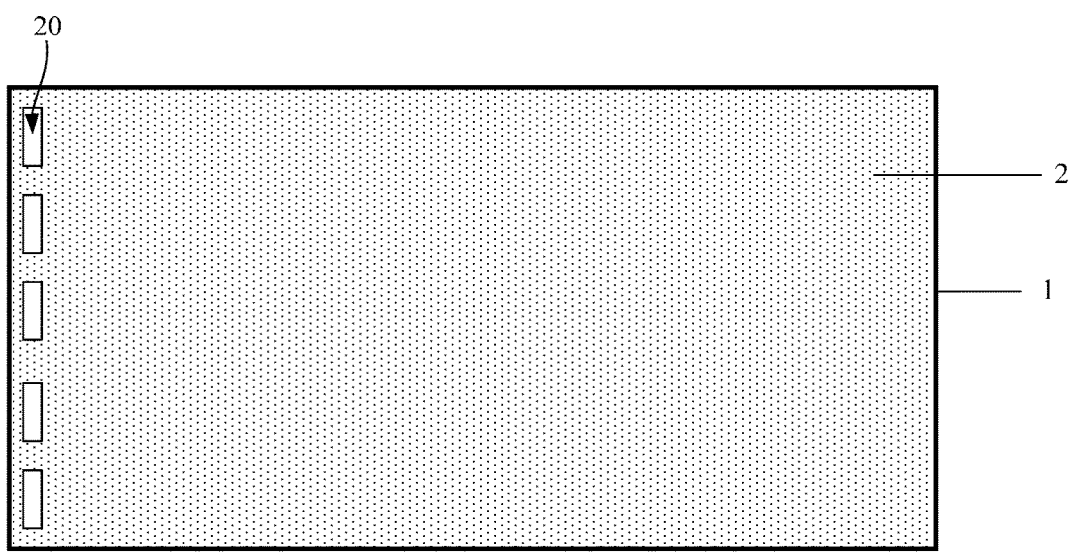
FIG. 4 is a top view of a light guide plate and the back plate of the edge-type backlight source according to one embodiment of the present disclosure.

As shown in FIGS. 1, 3 and 4, the present disclosure provides in this embodiment a backlight source, which includes a back plate 1 and a light guide plate 2. The back plate 1 includes a bottom plate 11 and a side plate 12, and the side plate 12 and an upper surface C of the bottom plate 11 defines an accommodation cavity 10. The light guide plate 2 is arranged within the accommodation cavity 10. The light guide plate 2 is an optical structure injection-molded with the accommodation cavity 10 as a die cavity and connected to the back plate 1 to form one piece. In this way, the light guide plate 2 is engaged with the back plate 1 in a seamless manner, so as to prevent the occurrence of bright lines surrounding the backlight source.

A plurality of concaves 13 is provided on the lower surface B of the bottom plate 11. The plurality of concaves 13 is depressed toward the upper surface C. To be specific, the concaves 13 may be formed at the lower surface B of the bottom plate through punching or casting.

The light guide plate of the backlight source is an optical structure injection-molded on the back plate with the accommodation cavity as the die cavity and connected to the back plate to form one piece. In this way, there is no gap between the light guide plate and the back plate, so as to enable the back plate to directly shield the light beam at an edge of the light guide plate, thereby to prevent the occurrence of the bright lines surrounding the backlight source. In addition, it is able to improve strength of the back plate and prevent the back plate from being deformed easily. Furthermore, it is unnecessary for the backlight source to fix the light guide plate onto the back plate through a sealant, thereby to provide a product with a super narrow bezel, reduce a thickness of the backlight source and facilitate the assembling of the backlight source.

In this embodiment, the resultant backlight source may have an overall thickness smaller than 0.85 mm.

The back plate 1 may be made of an aluminum alloy and have a thickness of 0.1 mm. The light guide plate 2 may be made of transparent silica gel. To be specific, the transparent silica gel may be filled into the accommodation cavity 10 of the back plate 1, so as to manufacture the light guide plate 2 through the injection molding process. The light guide plate 2 may have a thickness of 0.4 mm to 2 mm.

Figure 2:
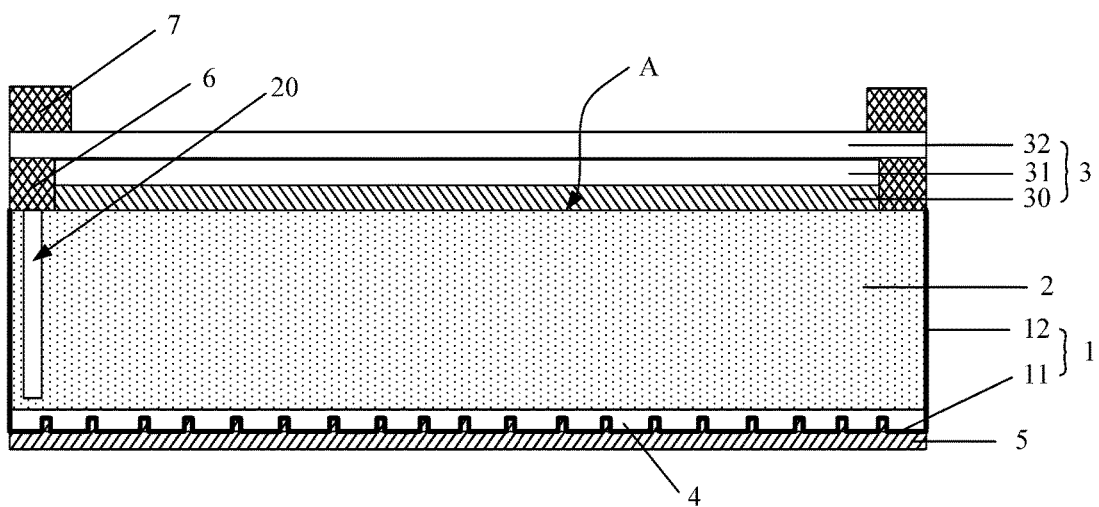
FIG. 2 is another sectional view of the edge-type backlight source according to one embodiment of the present disclosure.

As shown in FIG. 2, a reflection layer 4 is arranged on the upper surface C of the bottom plate 11 and between the light guide plate 2 and the bottom plate 11, so as to reflect the light beam toward the light-exiting surface A of the light guide plate 2, thereby to improve the light utilization.

The reflection layer 4 may be formed by coating a silver material onto the upper surface C of the bottom plate 11, i.e., it may be made of silver. The reflection layer 4 may have a thickness of 0.02 mm to 0.05 mm.

Apart from the light guide plate 2 and the back plate 1, the backlight source may further include a light source arranged adjacent to a light-entering surface of the light guide plate 2. The light beam from the light source may enter the light guide plate 2 through the light-entering surface, and exit the light guide plate 2 through the light-exiting surface A after the adjustment. The light source may include, but not limited to, a Light-Emitting Diode (LED), so it has such advantages as long service life, low power consumption and small volume.

Figure 5:
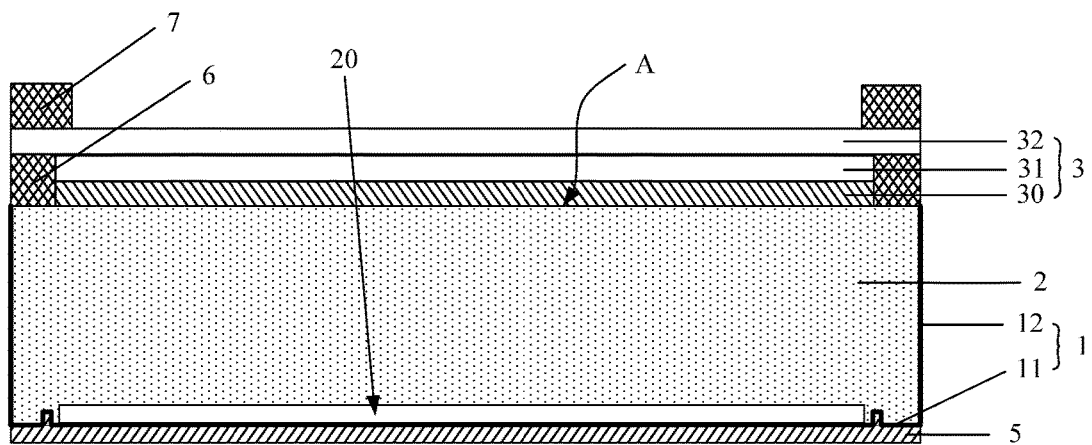
FIG. 5 is a sectional view of a direct-type backlight source according to one embodiment of the present disclosure.

Depending on a position of the light source, the backlight source may include an edge-type backlight source and a direct-type backlight source. For the edge-type backlight source, the light-entering surface of the light guide plate 2 is arranged adjacent to the light-exiting surface A and at a side surface of the light guide plate 2, i.e., the light source is arranged adjacent to the side surface of the light guide plate 2, as shown in FIG. 2. For the direct-type backlight source, the light-entering surface of the light guide plate 2 is arranged opposite to the light-exiting surface A and at a bottom surface of the light guide plate 2 adjacent to the bottom plate 11, i.e., the light source is arranged at a side of the light guide plate 2 where the bottom surface is located, as shown in FIG. 5.

In this embodiment, the light guide plate 2 is provided with a groove 20 at a light-entering side (i.e., a side where the light-entering surface is located), and the light source is arranged within the groove 20. The light source is directly arranged within the light guide plate 2, so it is able to prevent the light leakage at the light-entering side of the backlight source as well as light loss, thereby to reduce the power consumption. When the backlight source is the edge-type backlight source, it is unnecessary to adhere the light guide plate to a light bar through an adhesive tape.

In a possible embodiment of the present disclosure, the groove 20 may be formed using a same injection molding process for forming the light guide plate 2, so as to simplify the manufacture thereof.

Further, the light source may be of a shape adapted to a shape of the groove 20, so as to fix the light source within the groove 20, thereby to improve the stability of the light source.

In order to ensure the uniform light beams from the light-exiting surface A of the light guide plate 2 and provide a high-quality area light source, the light source may include at least two light bars arranged evenly adjacent to the light-entering surface of the light guide plate 2. In addition, through the at least two light bars, it is able to meet the brightness requirement in a better manner. Correspondingly, the light guide plate 2 may be provided with at least two grooves 20 at the light-entering side, and the light bars may be arranged within the grooves 20 respectively, so as to facilitate the fixation thereof.

Further, the light bar may be of a shape adapted to a shape of the groove 20, so as to facilitate the fixation of each light bar in the groove 20, thereby to improve the stability of the light bar.

The backlight source may further include an optical membrane 3, e.g., a prismatic lens or a diffuser. The optical membrane 3 may be arranged adjacent to the light-exiting surface A of the light guide plate 2 and configured to adjust the light beam from the light-exiting surface A of the light guide plate 2, so as to improve the uniformity of the light beam from the backlight source and provide a uniform area light source.

The optical membrane 3 may be fixedly adhered onto the light-exiting surface A of the light guide plate 2 through a first adhesive layer 6.

The optical membrane 3 may include a diffuser 30, a lower prismatic lens 31 and an upper prismatic lens 32 sequentially arranged on the light-exiting surface A of the light guide plate 2. The first adhesive layer 6 may be arranged between the upper prismatic lens 32 and the light-exiting surface A of the light guide plate 2 and configured to fixedly adhere the optical membrane 3 onto the light-exiting surface A of the light guide plate 2. The first adhesive layer 6 may be made of a transparent adhesive containing white resin micro particles. To be specific, the transparent adhesive containing the white resin micro particles may be coated onto a lower surface of the upper prismatic lens 32 adjacent to the light guide plate 2, so as to form the first adhesive layer 6.

In order to fix the backlight source onto a liquid crystal display panel, a nontransparent adhesive may be coated onto an upper surface C of the upper prismatic lens 32 away from the light guide plate 2, so as to form a second adhesive layer 7. The second adhesive layer 7 may contain black resin micro particles each having a particle size of 0.1 mm, so as to fixedly adhere the backlight source to the liquid crystal display panel and improve the quality of the display module (according to Snell's law). In addition, the backlight source is fixedly connected to the liquid crystal display panel through the adhesive layer, it is unnecessary to provide any front frame for assembling the backlight source with the liquid crystal display panel, thereby to provide a bezel-free product and facilitate the assembling of the display module. The second adhesive layer 7 may be arranged at a position corresponding a non-display region of the liquid crystal display panel, so as to prevent the occurrence of light leakage at the non-display region.

In a possible embodiment of the present disclosure, the backlight source is the edge-type backlight source, the light-entering surface of the light guide plate 2 is arranged adjacent to the light-exiting surface A, and the light-exiting surface A is arranged opposite to a upper surface of the bottom plate. The optical membrane 3 is fixedly adhered onto the light-exiting surface A of the light guide plate 2 through the first adhesive layer 6.

The light guide plate 2 is provided at the light-entering side with at least two grooves 20, and each groove 20 extends to the light-exiting surface A of the light guide plate 2, i.e., the groove 20 is arranged in the light-exiting surface A of the light guide plate 2 at a side adjacent to the light-entering side. The light bars of the light source are arranged within the grooves 20 respectively. In addition, each light bar is of a shape adapted to a shape of the groove 20 and a length same as a depth of the groove 20. In this way, through the optical membrane 3 fixedly adhered onto the light-exiting surface A, it is able to fixedly press the light bar into the groove 20, thereby to improve the stability of the light bar.

In this embodiment, the groove 20 may be manufactured through a same injection molding process for forming the light guide plate 2, so as to simplify the manufacture thereof.

The light bars are arranged within the grooves 20 respectively, so it is unnecessary to provide any additional fixation structure, thereby to simplify the entire structure and facilitate the implementation thereof.

How the light bars are arranged within the grooves 20 has been described hereinabove by taking the edge-type backlight source as an example.

As shown in FIG. 5, for the direct-type backlight source, the light-entering surface of the light guide plate 2 is arranged opposite to the light-exiting surface A. In order to forming the grooves 20 while forming the light guide plate through the injection molding process, the grooves 20 may be formed in the light-entering surface of the light guide plate 2. When the light bars are arranged within the grooves 20 respectively, each light bar may be fixedly pressed onto the upper surface C of the bottom plate 11 through the light guide plate 2, as long as the light bar is of a shape adapted to a shape of the groove 20 and a length same as a depth of the groove 20.

In order to prevent the appearance of the produce from being adversely affected by an uneven bottom plate of the back plate, a planarization layer 5 for filling up the concaves 13 may be arranged on the lower surface B of the bottom plate 11. In addition, through the planarization layer 5, it is able to provide a planar surface and further improve the strength of the back plate 1.

The planarization layer 5 may be made of a black adhesive, i.e., the planarization layer 5 is nontransparent. In this way, it is able to prevent the light beam from the backlight source from being transmitted through the back plate 1, thereby to prevent the light leakage. In addition, after the black adhesive has been cured, it is able to further improve the strength of the back plate 1.

To be specific, the planarization layer 5 may have a thickness of 0.05 to 0.1 mm and may be made of a black, ultraviolet (UV)-curable adhesive. It may be cured when being irradiated with a UV light beam.

To be specific, as shown in FIGS. 1 to 3, the edge-type backlight source may include the back plate 1, the light guide plate 2, the light source and the optical membrane 3.

The back plate 1 includes the bottom plate 11 and the side plate 12. The side plate 12 and the upper surface C of the bottom plate 11 define the accommodation cavity 10. The plurality of concaves 13 is provided on the lower surface B of the bottom plate 11. The plurality of concaves 13 is depressed toward and protruded from the upper surface C. The silver reflection layer is arranged on the upper surface C of the bottom plate 11. The black adhesive layer for filling up the concaves 13 is arranged on the lower surface B of the bottom plate 11, so as to provide a planar surface.

The light guide plate 2 is injection-molded with the accommodation cavity 10 as the die cavity, and arranged within the accommodation cavity 10 in such a manner that the light guide plate 2 is engaged with the back plate 1 in a seamless manner. The light-exiting surface A of the light guide plate 2 is arranged adjacent to the light-entering surface. The at least two grooves 20 are formed at the light-entering side of the light guide plate 2 while injection-molding the light guide plate 2, and each groove 20 extends to the light-exiting surface A of the light guide plate 2.

The light source includes the at least two light bars arranged within the grooves 20 respectively. Each light bar is of a shape adapted to a shape of the groove 20 and a length same as a depth of the groove 20.

The optical membrane 3 includes the diffuser 30, the lower prismatic lens 31 and the upper prismatic lens 32 sequentially arranged on the light-exiting surface A of the light guide plate 2. The transparent adhesive is applied onto the lower surface of the upper prismatic lens 32 adjacent to the light guide plate 2, so as to form the first adhesive layer 6. The optical membrane 3 is fixedly adhered onto the light-exiting surface A of the light guide plate 2 through the first adhesive layer 6. The upper prismatic lens 32 is configured to fixedly press the light bar into the corresponding groove 20 through the first adhesive layer 6.

The nontransparent adhesive is coated onto the upper surface C of the upper prismatic lens 32 away from the light guide plate 2, so as to form the second adhesive layer 7. The optical membrane 3 is fixedly adhered onto the liquid crystal display panel through the second adhesive layer 7. The second adhesive layer 7 is arranged at a position corresponding to the non-display region of the liquid crystal display panel.

For the edge-type backlight source, its manufacture procedure may include: manufacturing a mold; melting light-weighted magnesium aluminum alloy; maintaining a temperature of the melted magnesium aluminum alloy; forming the back plate through casting (including pre-heating the mold, setting parameters, spraying a release agent, clamping the mold and die-casting), the lower surface B of the bottom plate of the back plate being provided with concaves; cleaning the back plate; coating the silver reflection layer having a thickness of 0.02 mm onto the upper surface C of the bottom plate; coating the black adhesive having a thickness of 0.1 mm onto the lower surface B of the bottom plate, and curing the black adhesive with a UV light beam, so as to form the planarization layer; and injecting transparent silica gel into the accommodation cavity of the back plate acquired after surface treatment so as to form the light guide plate having a thickness of 2 mm, and injection-molding the grooves at the light-entering side of the light guide plate.

Figure 6:
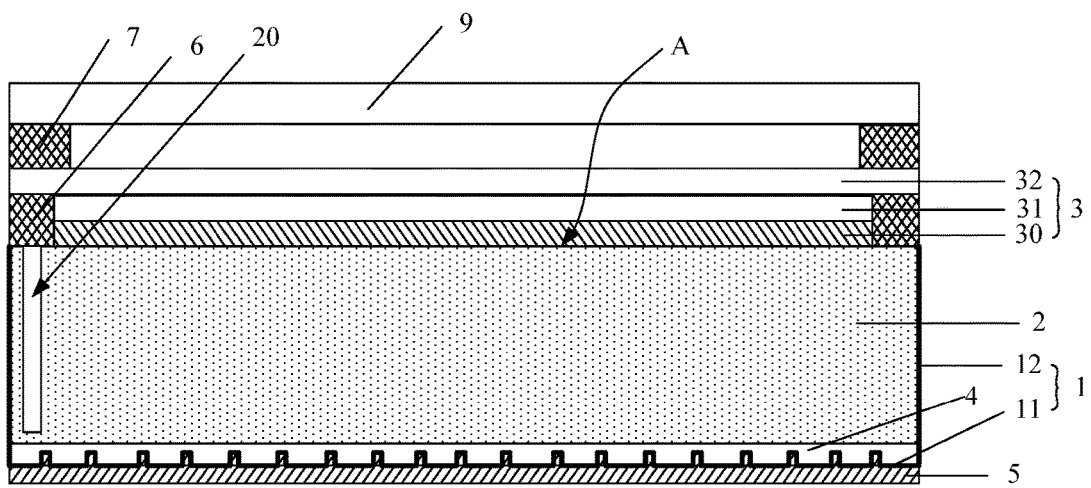
FIG. 6 is a sectional view of a display module according to one embodiment of the present disclosure.

As shown in FIG. 6, the present disclosure provides in this embodiment a display module including a display panel 9 and the above mentioned backlight source. The backlight source is configured to provide a light beam to the display panel for displaying an image.

According to the display module in the second embodiment of the present disclosure, the light guide plate 2 of the backlight source is formed on the back plate 1 through the injection molding process, so there is no gap between the light guide plate and the back plate. In this way, it is able for the back plate to directly shield the light beam at the edge of the light guide plate, thereby to prevent the occurrence of bright lines surrounding the backlight source and improve the quality of the display module. In addition, it is able to improve the strength of the back plate and prevent the back plate from being deformed easily. Furthermore, it is unnecessary to fix the light guide plate onto the back plate through a sealant, thereby to provide a product with a super narrow bezel, reduce a thickness of the product and facilitate the assembling of the display module.

Further, the display panel 9 may be fixedly adhered onto the display module at the side where the light-exiting surface A of the light guide plate is located through the second adhesive layer 7, so it is unnecessary to provide any front frame for assembling the display panel with the backlight source, thereby to provide a bezel-free product. The second adhesive layer is made of a nontransparent adhesive and arranged at a position corresponding a non-display region of the display panel 9, so it is able to prevent the light leakage at the non-display region and improve the display quality.

To be specific, the optical membrane 3 of the backlight source is fixedly adhered onto the light-exiting surface A of the light guide plate through the first adhesive layer 6, so the display panel 9 may be fixedly adhered onto a surface of the optical membrane away from the light-exiting surface A through the second adhesive layer 7.

The present disclosure further provides in some embodiments a display device including the above-mentioned display module. According to the display device in the embodiments of the present disclosure, it is able to improve the display quality, provide a product with a super narrow bezel or a bezel-free product, reduce a thickness of the product, and facilitate the assembling thereof.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A backlight source, comprising:
    a back plate comprising a bottom plate and a side plate, the side plate and the bottom plate defining an accommodation cavity; and
    a light guide plate arranged within the accommodation cavity,
    wherein a plurality of concaves is provided on a first surface of the bottom plate opposite of the light guide plate, the plurality of concaves being depressed toward a second surface of the bottom plate close to the light guide plate, wherein a planarization layer for filling up the plurality of concaves is arranged on the first surface of the bottom plate away from the light guide plate, so as to provide a planar surface, and wherein the planarization layer is a black adhesive layer.

2. The backlight source according to claim 1, wherein a reflection layer is arranged on the second surface of the bottom plate close to the light guide plate.

3. The backlight source according to claim 2, wherein the reflection layer is made of silver and has a thickness of 0.02 mm to 0.05 mm.

4. The backlight source according to claim 1, wherein a groove is provided at a light-entering side of the light guide plate, and the backlight source further comprises a light source arranged within the groove.

5. The backlight source according to claim 4, wherein the light source comprises at least two light bars, at least two grooves are provided at a light-entering side of the light guide plate, and the at least two light bars are arranged in the at least two grooves respectively.

6. The backlight source according to claim 4, wherein the light guide plate is injection-molded with the accommodation cavity as a die cavity, and the groove is formed using an injection molding processor for forming the light guide plate.

7. The backlight source according to claim 5, wherein the light guide plate further comprises a light-exiting surface arranged opposite to the second surface of the bottom plate close to the light guide plate.

8. The backlight source according to claim 7, wherein the groove extends to the light-exiting surface of the light guide plate.

9. The backlight source according to claim 7, further comprising an optical membrane arranged close to the light-exiting surface of the light guide plate and fixedly adhered onto the light-exiting surface of the light guide plate by a first adhesive layer.

10. The backlight source according to claim 5, wherein the light bar is of a shape adapted to a shape of the groove and has a length equal to a depth of the groove.

11. The backlight source according to claim 9, wherein the optical membrane comprises a diffuser, a lower prismatic lens and an upper prismatic lens sequentially arranged on the light-exiting surface of the light guide plate, and the first adhesive layer is arranged between the lower prismatic lens and the light-exiting surface of the light guide plate.

12. The backlight source according to claim 1, wherein the backlight source has a thickness smaller than 0.85 mm.

13. A display module, comprising a display panel and the backlight source according to claim 1.

14. The display module according to claim 13, wherein the display panel is fixedly adhered by a second adhesive layer onto a side of the light guide plate where a light-exiting surface is located.

15. The display module according to claim 14, wherein the backlight source further comprises an optical membrane fixedly adhered onto the light-existing surface of the light guide plate by a first adhesive layer, and the display panel is fixedly adhered onto a surface of the optical membrane away from the light-existing surface by the second adhesive layer.

16. A display device, comprising the display module according to claim 13.

17. An edge-type backlight source, comprising:

a back plate, the back plate comprising a bottom plate and a side plate, the side plate and the bottom plate defining an accommodation cavity, the bottom plate being provided with a plurality of concaves depressed toward the accommodation cavity, a reflection layer being arranged on a first surface of the bottom plate used to form the accommodation cavity, a black adhesive layer for filling up the concaves being arranged on a second surface of the bottom plate opposite to the first surface of the bottom plate used to form the accommodation cavity, so as to provide a planar surface;

a light guide plate injection-molded with the accommodation cavity as a die cavity and arranged within the accommodation cavity in such a manner that the light guide plate is engaged with the back plate in a seamless manner, a light-exiting surface of the light guide plate being arranged opposite to the first surface of the bottom plate used to form the accommodation cavity, a light-entering surface of the light guide plate being arranged close to the light-exiting surface, at least two grooves being formed at a light-entering side of the light guide plate using an injection molding process for forming the light guide plate, each groove extending to the light-exiting surface of the light guide plate;

a light source comprising at least two light bars arranged within the grooves respectively, each light bar being of a shape adapted to a shape of the groove and having a length equal to a depth of the groove; and an optical membrane comprising a diffuser, a lower prismatic lens and an upper prismatic lens sequentially arranged on the light-exiting surface of the light guide plate, a transparent adhesive being applied onto a first surface of the upper prismatic lens adjacent to the light guide plate so as to form a first adhesive layer, the optical membrane being fixedly adhered onto the light-exiting surface of the light guide plate through the first adhesive layer, and the upper prismatic lens being configured to fixedly press the light bar into a corresponding groove through the first adhesive layer.

18. The edge-type backlight source according to claim 17, wherein a nontransparent adhesive is applied onto a second surface of the upper prismatic lens away from the light guide plate so as to form a second adhesive layer for fixedly adhering the optical membrane onto a liquid crystal display panel, and the second adhesive layer is arranged at a position corresponding a non-display region of the liquid crystal display panel.

* * * * *